United States Patent
Sanuki

(10) Patent No.: US 9,377,976 B2
(45) Date of Patent: Jun. 28, 2016

(54) IMAGE PROCESSING SYSTEM, IMAGE PROCESSING PROGRAM, AND IMAGE PROCESSING METHOD

(71) Applicant: Konica Minolta, Inc., Tokyo (JP)

(72) Inventor: Yusuke Sanuki, Tokyo (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 14/569,460

(22) Filed: Dec. 12, 2014

(65) Prior Publication Data

US 2015/0169265 A1    Jun. 18, 2015

(30) Foreign Application Priority Data

Dec. 16, 2013    (JP) ................................ 2013-258926

(51) Int. Cl.
  *G06F 3/12*    (2006.01)
  *G06F 17/24*   (2006.01)

(52) U.S. Cl.
  CPC ............ *G06F 3/1215* (2013.01); *G06F 3/1212* (2013.01); *G06F 3/1252* (2013.01); *G06F 3/1256* (2013.01); *G06F 3/1285* (2013.01); *G06F 3/1288* (2013.01)

(58) Field of Classification Search
  USPC ............ 358/1.15, 2.1; 715/255; 707/667, 671
  See application file for complete search history.

(56) References Cited

U.S. PATENT DOCUMENTS

| 6,138,129 | A  | * | 10/2000 | Combs |  |
|---|---|---|---|---|---|
| 8,832,108 | B1 | * | 9/2014 | Sampson | 707/737 |
| 2003/0056082 | A1 | * | 3/2003 | Maxfield | 712/4 |
| 2009/0210412 | A1 | * | 8/2009 | Oliver et al. | 707/5 |
| 2011/0181909 | A1 | * | 7/2011 | Kakoi | 358/1.15 |
| 2014/0019852 | A1 | * | 1/2014 | Numata | 715/255 |
| 2014/0156670 | A1 | * | 6/2014 | Hosomi | 707/741 |

FOREIGN PATENT DOCUMENTS

| JP | 2004-181961 |   | 7/2004 |   |
|---|---|---|---|---|
| JP | 2012-203738 |   | 10/2012 |   |
| JP | 2015041309  | * | 3/2015  | G06F 17/30 |

* cited by examiner

*Primary Examiner* — Jerome Grant, II
(74) *Attorney, Agent, or Firm* — Squire Patton Boggs (US) LLP

(57) ABSTRACT

An image processing system having a display unit includes: a page range specifying unit that receives an input of a character string specifying a page range in a selected document; a page range identifying unit that identifies the page range in the document based on the input character string; a page image generating unit that preferentially generates the page images in the identified page range before page images of other pages; and a display control unit that causes the display unit to display the generated page image, wherein the page range identifying unit identifies a first page range specified by the input character string and a second page range to be specified by the input character string and a character string to be input immediately after the input character string, as the page range in which page images are to be preferentially generated before the other pages.

16 Claims, 13 Drawing Sheets

IMAGE PROCESSING SYSTEM, IMAGE PROCESSING PROGRAM, AND IMAGE PROCESSING METHOD

The entire disclosure of Japanese Patent Application No. 2013-258926 filed on Dec. 16, 2013 including description, claims, drawings, and abstract are incorporated herein by reference in its entirety.

BACKGROUND OF THE INVENTION

1. Field of the Invention

The present invention relates to an image processing system, an image processing program, and an image processing method, and more particularly, to an image processing system that performs rendering for displaying or printing out a document, an image processing program for controlling the sequence of the rendering, and an image processing method.

2. Description of the Related Art

When a document is printed out, a certain application is used for displaying previews or thumbnails of page images formed by rendering the data of the respective pages of the document, so as to check the contents of the document or the printed result. With such an application, a particular page range can be specified by inputting a character string. For example, when a user wishes to preview a page image, the user inputs the corresponding page number in the form of a text.

Also, when conducting printing, a user can specify a page to be printed out, by inputting a character string on a print setting screen. In this case, not all the pages included in a designated document but only the data of a desired page is rendered and printed out.

When a page image is displayed as a preview or a thumbnail or is printed out as described above, not only numbers but also symbols such as a comma (,) and a hyphen (-) are generally used to specify a particular page range through an input of a text. For example, when a hyphen is interposed between two different page numbers, the pages that fall between the two page numbers written on both sides of the hyphen can be specified as a page range. Also, when a comma is interposed between page numbers, pages that are apart from each other can be designated.

There might be a case where a rendering process requires time, and a server/client web application is used to render and generate page images on the server side, and transmit the generated page images to a client. In such a case, a long period of time might be required before a process using page images is started, depending on the communication speed and congestion of the network. When a user specifies a page range, it is essential that the page range is identified as quickly as possible, and the standby time before the start of a process using page images is shortened. To realize that, methods of preferentially rendering a particular page before the other pages have been suggested.

For example, JP 2012-203738 A discloses an information processing apparatus that performs control so that converted data generated from a designated page in subject data is acquired before the other non-stored converted data in the converted data generated from the subject data, when an operation reception unit receives a page designation and the converted data generated from the designated page in the subjected data is not stored. This publication discloses that the standby time of a user can be shortened by acquiring the converted data generated from a designated page before the other converted data.

JP 2004-181961 A discloses a system including a print preview system that functions to receive the information corresponding to a request for a preview of at least part of a print job, access the information corresponding to the print job, and display a thumbnail graphic corresponding to part of the requested print job via a display device. This publication discloses that the time required before the start of preview display of a page a user wishes to check can be shortened by determining the start page and the end page to be displayed as previews before the pages of the document are scanned.

By the above mentioned conventional methods, a particular page range can be preferentially rendered if the particular page range is determined in advance. However, in a case where a particular page range to be designated by a user cannot be clearly determined, such as when the user is still inputting a text, the page to be preferentially rendered cannot be identified, and the standby time is not sufficiently shortened.

For example, in a case where there is a period of time between an input of a number and an input of another number or a symbol, if a symbol is to be input after the first number, the page identified by the first number is a page to be preferentially rendered, but the rendering of the page cannot be started unless the input is confirmed. If another number is to be input after the first number, it is not clear whether the page identified by the first number is a page to be preferentially rendered. Although at least the page corresponding to the number is considered to be a page to be preferentially rendered, the rendering of the page cannot be started unless the input is confirmed.

In a case where a number is input, at least the page corresponding to the number is a page to be preferentially rendered. By a conventional technique, however, the rendering is not started before the input is confirmed (or before an operation to determine a text input is performed). Therefore, the standby time before the start of a process (preview display, thumbnail display, or printing) using rendered page images cannot be shortened.

SUMMARY OF THE INVENTION

The present invention has been made in view of the above problems, and an object thereof is to provide an image processing system, an image processing program, and an image processing method that can shorten the standby time before the start of a process using page images of a document.

To achieve the abovementioned object, according to an aspect, an image processing system having a display unit to display page images of a document reflecting one aspect of the present invention comprises: a page range specifying unit that receives an input of a character string specifying a page range in a selected document; a page range identifying unit that identifies the page range in the document based on the input character string; a page image generating unit that preferentially generates page images in the identified page range before page images of other pages; and a display control unit that causes the display unit to display the generated page image, wherein the page range identifying unit identifies a first page range specified by the input character string and a second page range that can be specified by the input character string and a character string to be input immediately after the input character string, as the page range in which page images are to be preferentially generated before the other pages.

To achieve the abovementioned object, according to an aspect, a non-transitory recording medium storing a computer readable program which processes an image and which is executed in an apparatus that generates page images of a document to be displayed by a display unit reflecting one aspect of the present invention causes the apparatus to: receive an input of a character string specifying a page range in a selected document; identify the page range in the document based on the input character string; and preferentially generate the page images in the identified page range before page images of other pages, wherein, in identifying the page range, a first page range specified by the input character string and a second page range that can be specified by the input character string and a character string to be input immediately after the input character string are identified as the page range in which page images are to be preferentially generated before the other pages.

To achieve the abovementioned object, according to an aspect, an image processing method implemented in a system having a display unit to display page images of a document reflecting one aspect of the present invention comprises: receiving an input of a character string specifying a page range in a selected document; identifying the page range in the document based on the input character string; preferentially generating the page images in the identified page range before page images of other pages; and displaying the generated page image on the display unit, wherein, the identifying the page range includes identifying a first page range specified by the input character string and a second page range to be specified by the input character string and a character string to be input immediately after the input character string, as the page range in which page images are to be preferentially generated before the other pages.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

As described above in the Description of the Related Art, in a case where a document is displayed for a preview, is displayed as thumbnails, or is printed out, the data of each page of the document is rendered, and page images are generated. However, the rendering process requires time, and a long period of time is required before a process using page images of desired pages is started. To counter this problem, a page range can be input so that desired pages are rendered first. By a conventional technique, however, the standby time before the start of a process using page images cannot be shortened.

In a case where a number is input, at least the page corresponding to the number is a page to be preferentially rendered. By a conventional technique, however, the rendering is not started before an input is confirmed (or before an operation to determine a text input is performed). Therefore, when an input takes a long time, pages desired by the user cannot be preferentially rendered.

In view of this, an embodiment of the present invention provides an image processing system (an image processing program) that inputs a desired page range in the form of a text before a document is displayed for a preview, is displayed as thumbnails, or is printed out. In this image processing system, a character string for specifying the page range is input before all the pages are rendered, the page range specified by the character string that has already been input by the user and a page range that can be specified by the already input character string and an input of a character string immediately after the already input character string are identified, and the pages in the identified page ranges are preferentially rendered before the other pages.

For example, while the user is inputting a number, the page range specified by a number that has already been input is preferentially rendered, and a number or a symbol that can follow the already number is estimated. In this manner, a page range that might be designated by the user is identified, and the identified page range is preferentially rendered.

In this manner, a rendering is started before the user confirms a character string to specify a page range (or while the user is still inputting a character string). Accordingly, the standby time before the start of a process (display or printing) using page images of a page range specified by the user can be shortened.

EXAMPLE

Figure 1:
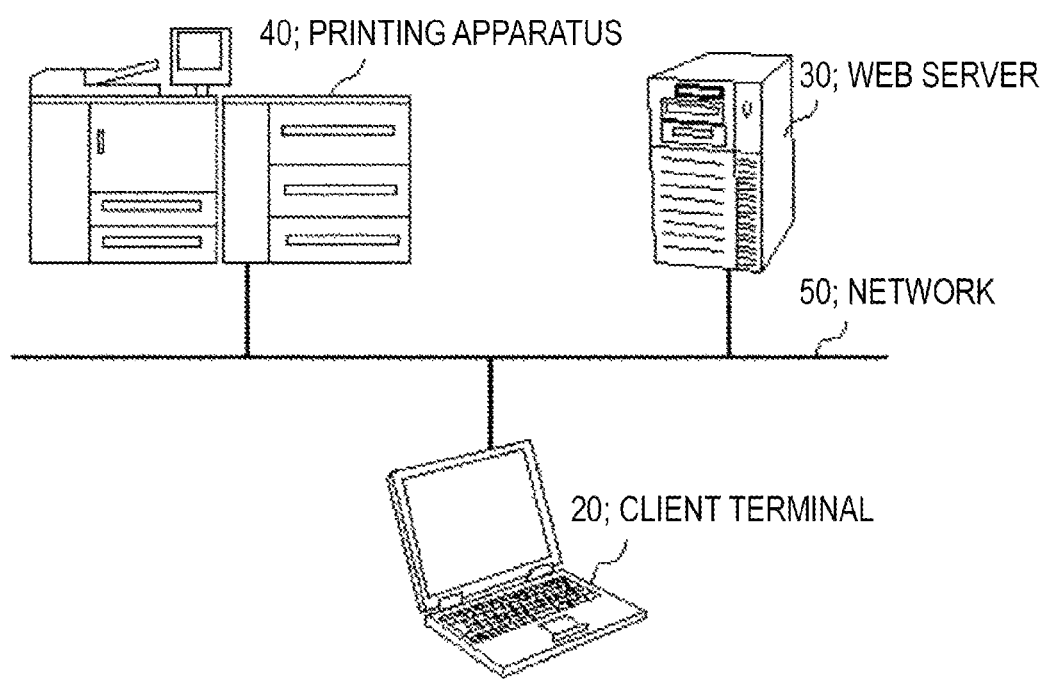
FIG. 1 is a diagram schematically showing the entire configuration of an image processing system according to an embodiment of the present invention.
Figure 2A:
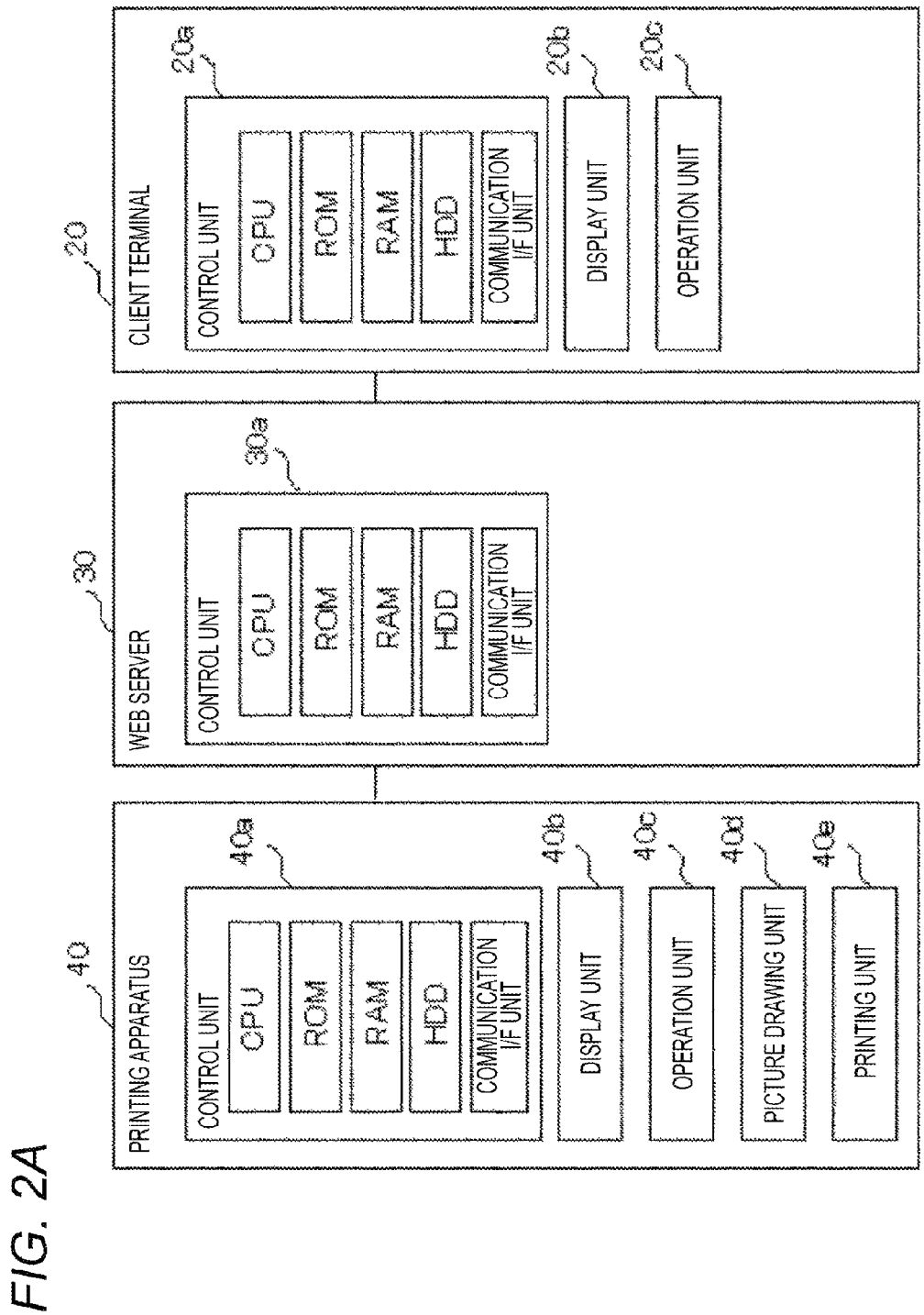
FIG. 2A is a block diagram showing the hardware structure of the image processing system according to the embodiment of the present invention.
Figure 2B:
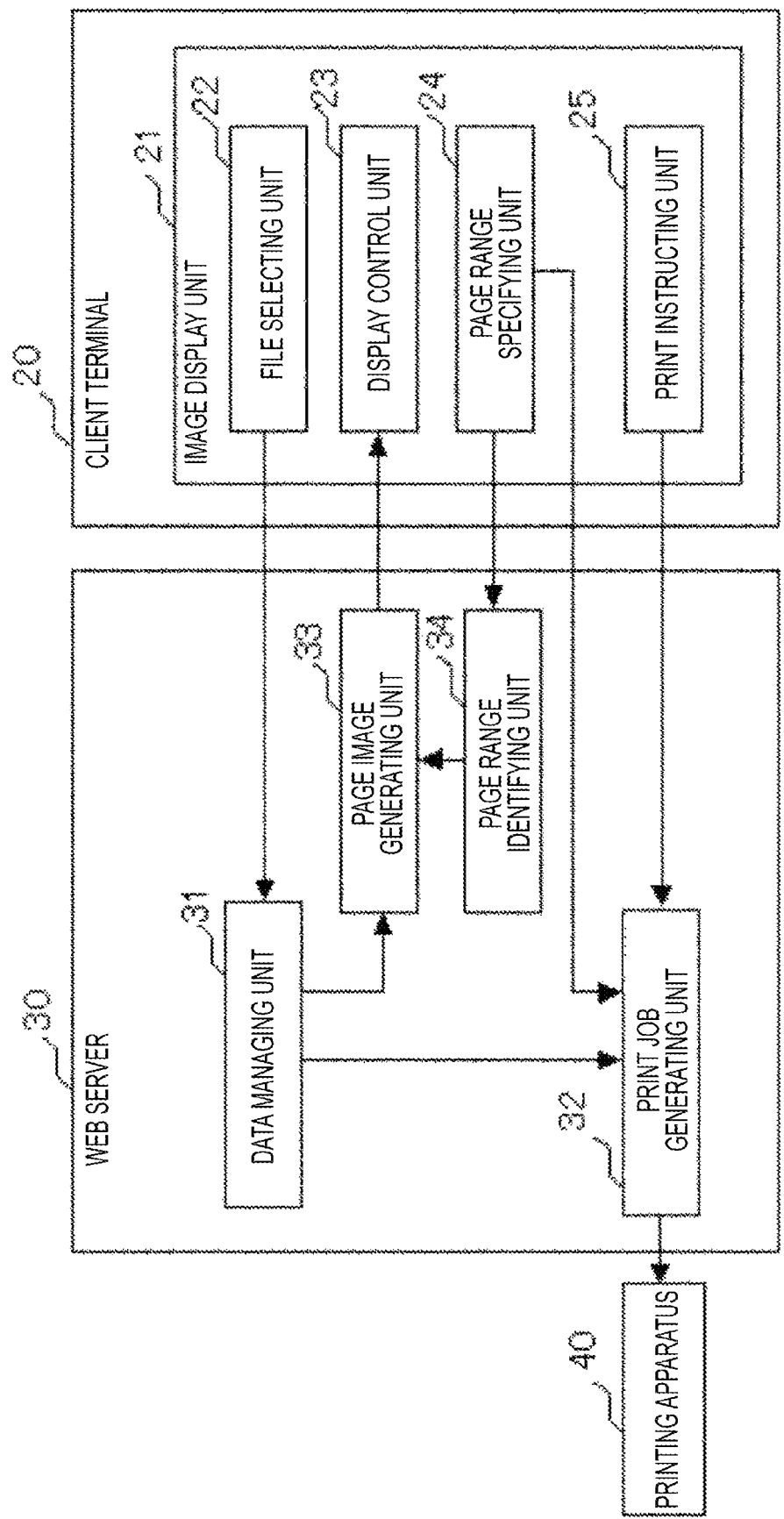
FIG. 2B is a block diagram showing the software structure of the image processing system according to the embodiment of the present invention.
Figure 3:
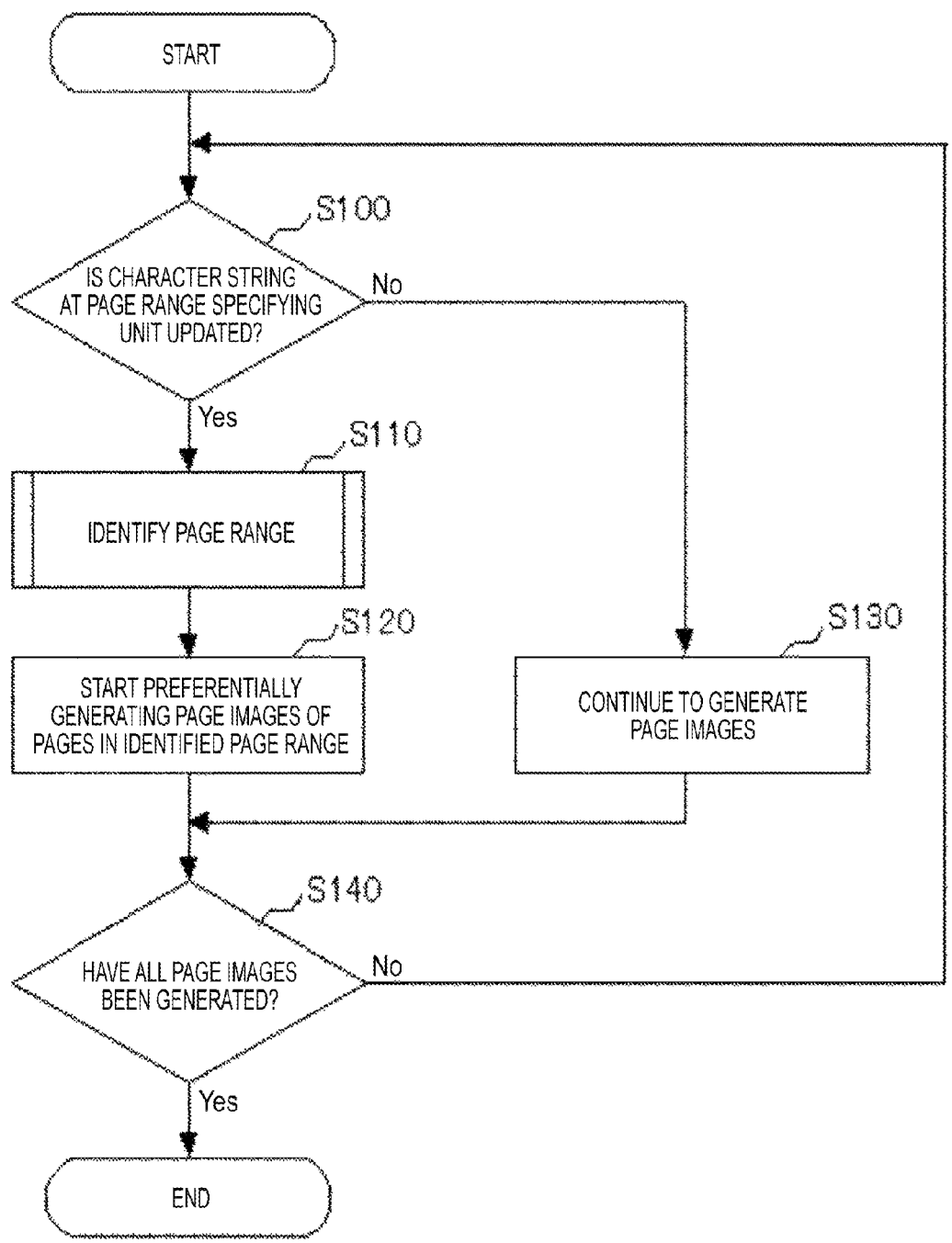
FIG. 3 is a flowchart showing a process (a page image generating process) to be performed by the image processing system (a web server) according to the embodiment of the present invention.
Figure 4:
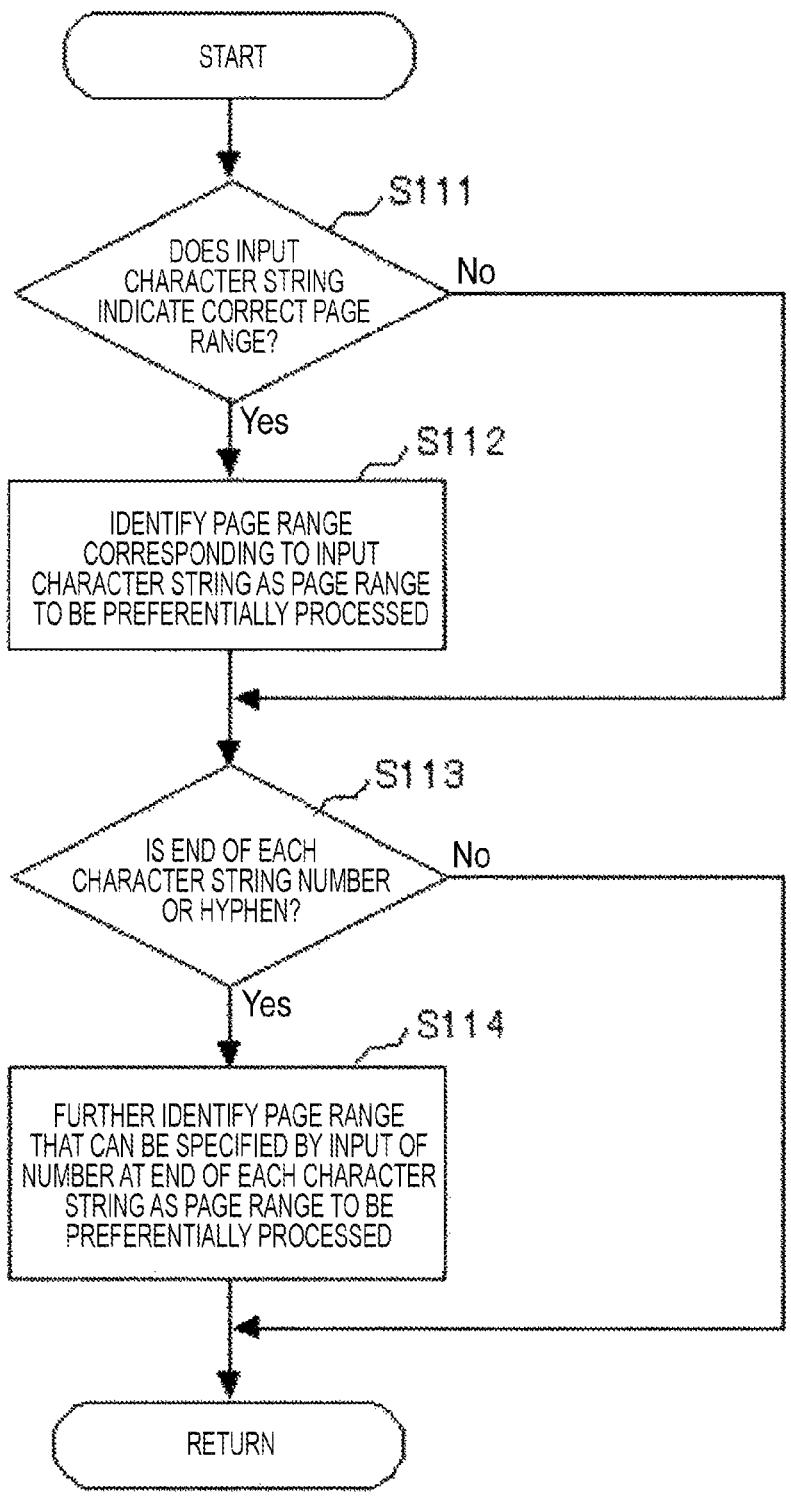
FIG. 4 is a flowchart showing a process (a page range identifying process) to be performed by the image processing system (the web server) according to the embodiment of the present invention.

To explain the above described embodiment of the present invention in greater detail, an image processing system, an image processing program, and an image processing method according to an example of the present invention are described, with reference to FIGS. 1 to 9. FIG. 1 is a diagram schematically showing the entire configuration of the image processing system of this example, and FIG. 2 is a block diagram showing the configuration of the image processing system. FIGS. 3 and 4 are flowcharts showing a process to be performed by the image processing system (a web server) of this example, and FIGS. 5 to 9 are diagrams showing examples of thumbnail display of this example. The present invention can be applied to any system that uses page images after renderings. however, the example described below concerns a system that is used for thumbnail display (arranged display of reduced page images) when documents are printed out.

As shown in FIG. 1, an image processing system 10 of this example includes one or more client terminals 20 that issue print instructions, a web server 30 that provides the client terminal(s) 20 with web services, and one or more printing apparatuses 40 that perform printing. These components are connected to one another by a network 50 such as a LAN (Local Area Network) or a WAN (Wide Area Network) specified in standards of the Ethernet (a registered trademark), the Token Ring, FDDI (Fiber-Distributed Data Interface), or the like. The web server 30 renders a page of a document to be printed out, generates a page image, and transfers the page image to a client terminal 20. The client terminal 20 performs a thumbnail display based on the page image. The respective apparatuses are described below in detail.

(Client Terminal)

A client terminal 20 is an information processing apparatus such as a personal computer, a mobile terminal, or a tablet terminal, and includes a control unit 20a, a display unit 20b, an operation unit 20c, and the like, as shown in FIG. 2A.

The control unit 20a includes a CPU (Central Processing Unit), memories such as a ROM (Read Only Memory) and a RAM (Random Access Memory), a HDD (Hard Disk Drive), a communication interface unit, and the like, and these components are connected via a bus. The CPU controls the respective components. The memories are components that store various kinds of data read through the communication interface unit, and the stored data is processed by the CPU and is transferred to the HDD and the communication interface unit if necessary. The HDD stores programs (including a printer driver for enabling various settings related to printing, a program for realizing web client functions to enable use of web services provided by the web server 30, and the like) for the CPU to control the respective components, information about the processing functions of its own apparatus, and the like. The programs and the information are read by the CPU as necessary, and are executed or processed in the memories. The communication interface unit is formed with an NIC (Network Interface Card), a modem, or the like, and establishes a connection with a device via the network 50 to perform data transmission/reception.

The display unit 20b is formed with an LCD (Liquid Crystal Display) or the like, and displays a file select screen on which a document file to be printed out is selected, a print setting screen on which printing conditions are set, thumbnails based on page images provided from the web server 30, and the like. The operation unit 20c is formed with a keyboard, a mouse, and the like, and enables a print setting operation on the print setting screen, an operation to input a character string to specify a page range in the thumbnail display, and the like.

(Web Server)

The web server 30 is an information processing apparatus such as a computer apparatus, and includes a control unit 30a and the like, as shown in FIG. 2A.

The control unit 30a includes a CPU, memories such as a ROM and a RAM, a HDD, a communication interface unit, and the like, and these components are connected via a bus. The CPU controls the respective components. The memories are components that store various kinds of data read through the communication interface unit, and the stored data is processed by the CPU and is transferred to the HDD and the communication interface unit if necessary. The HDD stores programs (including a a program for realizing web server functions to provide the client terminal 20 with web services, and the like) for the CPU to control the respective components, information about the processing functions of its own apparatus, and the like. The programs and the information are read by the CPU as necessary, and are executed or processed in the memories. The communication interface unit is formed with an NIC, a modem, or the like, and establishes a connection with a device via the network 50 to perform data transmission/reception.

(Printing Apparatus)

The printing apparatus 40 is an image forming apparatus such as an MFP (Multi Function Peripheral), and, as shown in FIG. 2A, includes a control unit 40a, a display unit 40b, an operation unit 40c, a picture drawing unit 40d, and a printing unit 40e.

The control unit 40a includes a CPU, memories such as a ROM and a RAM, a HDD, a communication interface unit, and the like, and these components are connected via a bus. The CPU controls the respective components. The memories are components that store various kinds of data read through the communication interface unit, and the stored data is processed by the CPU and is transferred to the HDD and the communication interface unit if necessary. The HDD stores a program for the CPU to control the respective components, information about the processing functions of its own apparatus, and the like, and the program and the information are read by the CPU as necessary, and are executed or processed in the memories. The communication interface unit is formed with an NIC, a modem, or the like, and establishes a connection with a device via the network 50 to perform data transmission/reception.

The display unit 40b is formed with an LCD or the like, and displays various kinds of screens related to printing. The operation unit 40c is formed with a touch panel, hardware keys, or the like, and enables various kinds of operations related to printing.

The picture drawing unit 40d analyzes a printing job received from the web server 30, rasterizes the data of each page, and generates print data.

The printing unit 40e includes components such as a charging device, a photosensitive drum, an exposure device, a transfer roller, a transfer belt, a fixing device, and the like, which are necessary for image formation using an image forming process such as an electrophotographic process or an electrostatic recording process. Specifically, the photosensitive drum charged by the charging device is irradiated with light from the exposure device in accordance with print data, to form an electrostatic latent image. The electrostatic latent image is developed by a developing device applying charged toner thereto. The toner image is transferred onto a paper medium via a primary transfer roller and a secondary transfer belt, and is fixed by the fixing device.

In this example, the printing apparatus 40 only has a printing function, but may also have a scanning function, a facsimile function, and the like.

The client terminal 20 and the web server 30 are controlled by an OS (Operating System), and the software that controls thumbnail display of this example (a web application including an image processing program for controlling operations related to renderings) is stored in the client terminal 20 and the web server 30. FIG. 2B shows the functions of the software to be executed by the image processing system 10 of this example. In a case where the software functions not as a preview application but as a document viewer application, there is no need to prepare the printing apparatus 40, the print job generating unit 32, and the print instructing unit 25 shown in FIG. 2B, and the functions to exchange information with the printing apparatus 40, the print job generating unit 32, and the print instructing unit 25.

As shown in FIG. 2B, the control unit 30a of the web server 30, under the web application, functions as a data managing unit 31, the print job generating unit 32, a page image generating unit 33, a page range identifying unit 34, and the like. Particularly, in accordance with the image processing program included in the web application, the control unit 30a functions as the page image generating unit 33, the page range identifying unit 34, and the like.

The data managing unit 31 manages the programs in the web application, screen information, and document files to be processed. The client terminal 20 downloads a program and screen information from the data managing unit 31, and performs an internal process in accordance with the web application or displays an image via a web browser. The data managing unit 31 also transfers a document file being managed therein to the print job generating unit 32.

Based on print settings specified at the print instructing unit 25 of the client terminal 20, the print job generating unit 32 generates a print job to issue a print instruction based on a document acquired from the data managing unit 31 and page information specified at a page range specifying unit 24 of the client terminal 20. The data of the generated print job is transmitted to the printing apparatus 40, and the document is printed out by the printing apparatus 40.

The page image generating unit 33 performs rendering of the pages included in a document file stored in the data managing unit 31, and generates page images of the respective pages. If a page range is identified by the page range identifying unit 34 at this point, the pages included in the page range are preferentially rendered. The generated page images are then sequentially transmitted to a display control unit 23 of the client terminal 20.

The page range identifying unit 34 receives a character string that is input by a user using the page range specifying unit 24 of the client terminal 20, identifies a page range (that may include only one page) specified by the input character string, and a page range that can be specified by the input character string and a character string to be next input, and notifies the page image generating unit 33 of the identified page ranges. Specifically, in a case where a number ("2", for example) is input by a user using the page range specifying unit 24, the page range identifying unit 34 identifies the page corresponding to the input number, and the page corresponding to a number that can be specified by the input number and a number to be input immediately after the input number or the page corresponding to a number (such as "20", "21", or the like) having the input number as the highest digit. If a symbol (such as "-") is input after a number, the page range having the input number as the start page and the number to be input immediately after "-" as the last page (such as "2-3", "2-4", or the like) is identified.

As shown in FIG. 2B, the control unit 20a of the client terminal 20 also functions as an image display unit 21 in accordance with the web application. The image display unit 21 includes a file selecting unit 22, the display control unit 23, the page range specifying unit 24, the print instructing unit 25, and the like. The image display unit 21 receives user inputs, and displays necessary information. Particularly, in accordance with the image processing program included in the web application, the image display unit 21 functions as the display control unit 23, the page range specifying unit 24, and the like.

The file selecting unit 22 enables selection of a document file to be printed out. A selected document file is uploaded onto the web server 30, and is managed by the data managing unit 31 of the web server 30.

The display control unit 23 sequentially receives the data of page images of a document from the page image generating unit 33 of the web server 30, and displays the data as thumbnail images on the display unit 20b of the client terminal 20. If a page image of a distant page is received, the display order of page images is changed by performing screen scrolling, increasing the number of page images being displayed on the screen, arranging the page images in order of reception, or the like, so that the received page image is also displayed on the display unit 20b.

The page range specifying unit 24 receives a character string from a user to specify a page range. For example, a column for inputting a character string is formed on the screen on which thumbnail display is performed, so that a character string can be input through the operation unit 20c of the client terminal 20. The page range identifying unit 34 of the web server 30 is then notified of the input character string.

Based on screen information acquired from the data managing unit 31 of the web server 30, the print instructing unit 25 displays a user interface for print settings on the web browser. Upon receipt of a print instruction from the user, the print instructing unit 25 transmits the print instruction to the print job generating unit 32 of the web server 30.

Although the web server 30 renders a document file and generates page images in this example, the client terminal 20 may render a document file, generate page images, and display the generated page images. In that case, the control unit 20a of the client terminal 20 is made to function as a page image generating unit and a page range identifying unit.

The processing by the entire software of this example is described below. This example is in the form of a web application that functions as a client server system, and a user uses the web application through the client terminal 20.

First, the user uses the client terminal 20 to start the web application, and uses the image display unit (the file selecting unit 22) of the web application to specify a document file to be printed out. The document file to be specified here may be a document file stored in the client terminal 20, a document file existing on the web, or a document file already stored in the web server 30. The document file specified at the file selecting unit 22 is then stored into the data managing unit 31 of the web server 30.

The page image generating unit 33 of the web server 30 generates page images by sequentially rendering the respective pages of the document file stored into the data managing unit 31, and sequentially transmits the generated page images to the display control unit 23 of the client terminal 20. The display control unit 23 sequentially displays the page images as thumbnails, and the user visually checks the page images. After that, the print job generating unit 32 of the web server 30 receives an instruction from the print instructing unit 25 of the client terminal 20, generates a print job so that the page range specified by the user using the page range specifying unit 24 is output as the print range, and transmits the generated print job to the printing apparatus 40.

In this example, when a character string is input by a user using the page range specifying unit 24, the web application (the image processing program) performs control so that page images of the pages in the page range identified by the input character string are preferentially generated (rendered). FIG. 3 is a flowchart showing the page image generation procedures in the web server 30.

First, the page range identifying unit 34 of the web server 30 determines whether a character string that has been input by the user using the page range specifying unit 24 of the client terminal 20 is updated (S100). If there is no character string in the column displayed by the page range specifying unit 24, the page image generating unit 33 generates page images in accordance with a predetermined rule (for example, sequentially from the first page to the last page) (No in S130, S140, and S100).

In a case where the character string that has been input by using the page range specifying unit 24 is updated (Yes in S100), the page range identifying unit 34 of the web server 30 identifies a range of pages whose images are to be preferentially generated (S110). This page range is formed with a page range specified by the character string already input by the user, and a page range that can be specified by the input character string and a character string to be input immediately after the input character string. This step will be described later in detail.

The page image generating unit 33 of the web server 30 generates page images of the pages in the page range identified by the page range identifying unit 34 before the other pages (S120), and sequentially transmits the generated page images to the display control unit 23 of the client terminal 20. If not all the page images have been generated (No in S140), the operation returns to S100, and the page range identifying unit 34 determines whether the character string that has been input through the page range specifying unit 24 of the client terminal 20 is updated.

If the character string that has been input through the page range specifying unit 24 is updated (Yes in S100), a range of pages whose images are to be preferentially generated is re-identified (S110), and the page image generating unit 33 generates page images of the pages in the re-identified page range before the other pages (S120). If the character string at the page range specifying unit 24 has not been updated (No in S100), the page image generation being performed by the page image generating unit 33 is continued (S130).

FIG. 4 is a flowchart showing the details of the page range identifying process (S110 in FIG. 3) to be performed by the page range identifying unit 34 when the character string that has been input by using the page range specifying unit 24 is updated.

First, the page range identifying unit 34 determines whether the character string that has been input by using the page range specifying unit 24 indicates a correct page range (S111). For example, if the input character string is a number, and the page identified by the number is included in the document file, the page range identifying unit 34 determines that the character string indicates a correct page range. In a case where the input character string is a number but the page identified by the number is not included in the document file, or where the input character string includes a symbol other than numbers but the page identified by the number that comes after the symbol is not included in the document file, the page range identifying unit 34 determines that the character string does not indicate a correct page range. In a case where the user is currently inputting a character string (or where the input character string includes a symbol other than numbers and the end of the character string is the symbol, for example), the page range identifying unit 34 determines that the character string does not indicate a correct page range. If the page range identifying unit 34 determines that the character string indicates a correct page range (Yes in S111), the page range identifying unit 34 identifies the page range corresponding to the input character string as a range of pages whose images are to be preferentially generated (S112).

After that, the page range identifying unit 34 determines whether the end of the character string is a number or a hyphen (S113). If the end of the character string is a number or a hyphen (Yes in S113), the page range identifying unit 34 further identifies a page range that can be specified by an input of a number at the end of the character string as a range of pages whose images are to be preferentially generated (S114). If the page range corresponding to the input character string has already been identified in S112, both the page range corresponding to the input character string (a first page range) and a page range that can be specified by the input character string and a further input of a number at the end of the character string (a second page range) are identified as a range of pages whose images are to be preferentially generated.

The reason that the end of the character string is limited to a number or a hyphen in S113 is that, if the end of the character string is neither a number nor a hyphen but is a comma, an input following the end of the character string is not affected by the character string that has been input earlier, and a page range that can be specified by a further input of a number at the end of the character string includes substantially all the pages. The reason that an input following the end of the character string is limited to a number is that, if a hyphen or a comma is allowed as a further input, the number of combinations of page ranges that can be specified becomes enormous.

As such a page range identifying process is performed, both the page range corresponding to an already input character string and a page range that might be input by the user can be identified as a range of pages whose images are to be preferentially generated.

A specific example of such a page range identifying method is now described. FIGS. 5A to 5D show in what order page images are generated/displayed in a case where a number and a symbol (a hyphen) are input as a character string. In this specific example, page images of a document formed with eight pages are displayed as thumbnails.

Figure 5A:
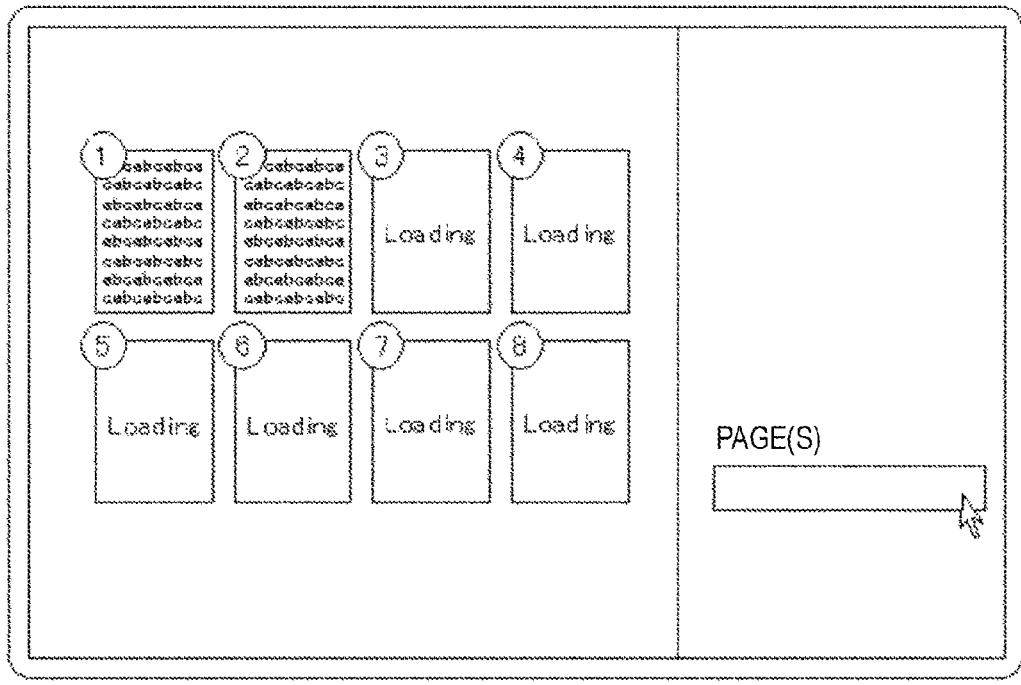
FIG. 5A is a diagram showing an example of thumbnail display (a situation prior to an input of a character string) according to the embodiment of the present invention.

In a case where any character string is not input to the column displayed by the page range specifying unit 24, page images are sequentially generated in ascending order of page numbers, starting from the first page, and the generated pages are displayed. FIG. 5A shows a situation where page images of the first two pages have been generated and displayed. In this situation where page images of the first and second pages have been generated, a page image of the third page is normally the next to be generated. However, if a character string "5-" is input at this point, the page ranges that can be specified by a further input of a number at the end of the character string are "5-6", "5-7", and "5-8" (any input other than these will be invalid as a specified page range), and therefore, page images of the fifth to eighth pages included in those page ranges are preferentially generated before the other pages. It should be noted that "I" shown after "5-" represents the cursor position, and indicates that the input has not been completed.

Figure 5B:
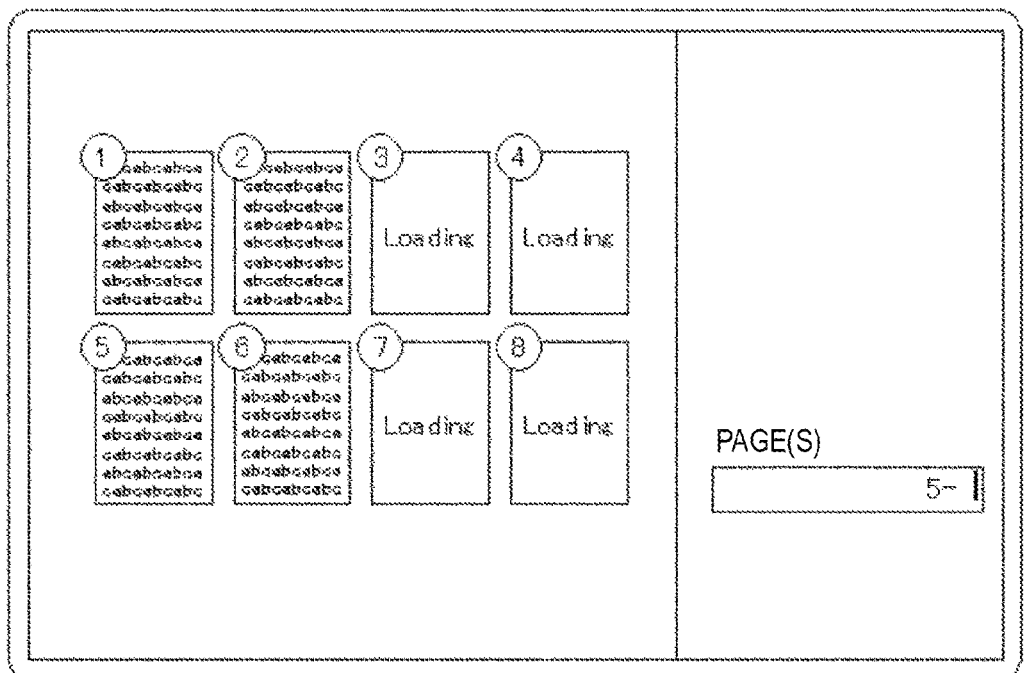
FIG. 5B is a diagram showing an example of thumbnail display (a situation where a number has been input) according to the embodiment of the present invention.
Figure 5C:
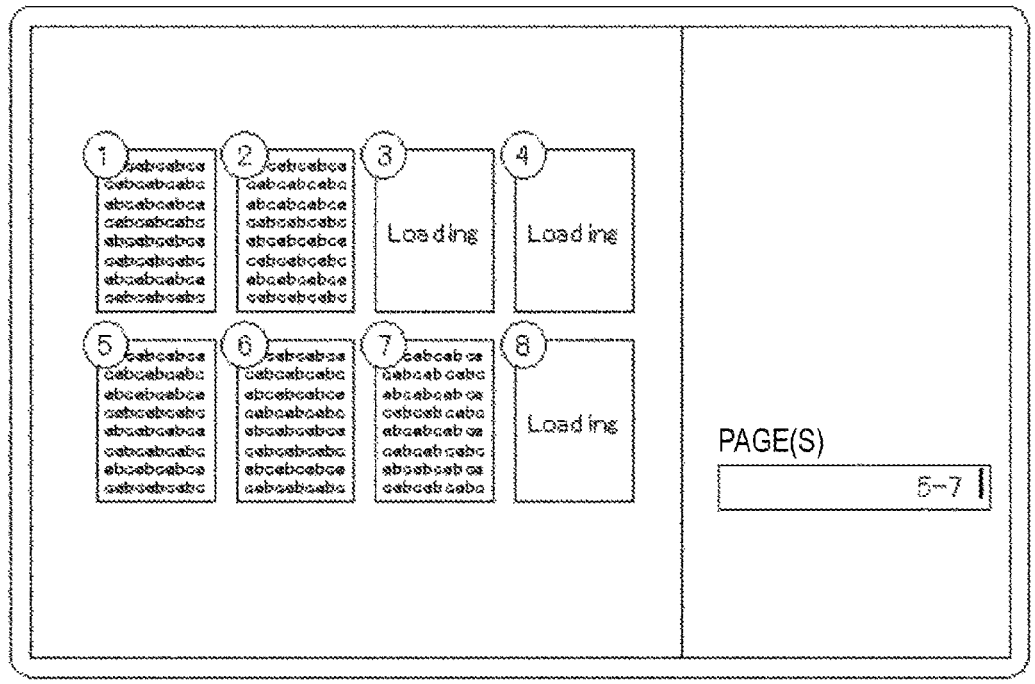
FIG. 5C is a diagram showing an example of thumbnail display (a situation where a symbol has been input after the number) according to the embodiment of the present invention.
Figure 5D:
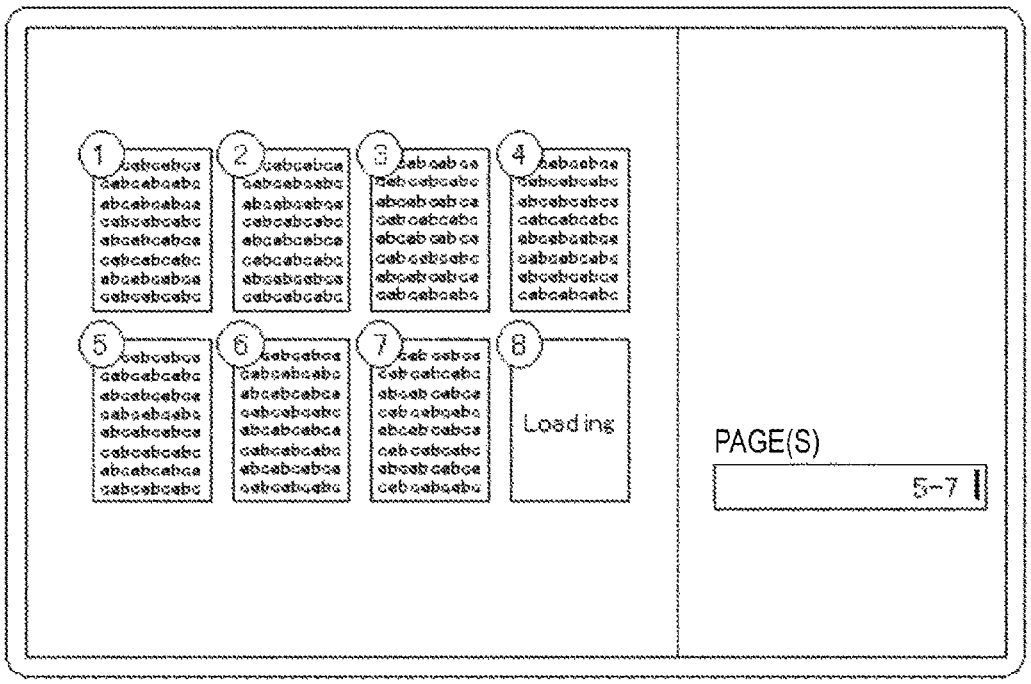
FIG. 5D is a diagram showing an example of thumbnail display (after the situation shown in FIG. 5C) according to the embodiment of the present invention.

FIG. 5B shows a situation where page images of the fifth and sixth pages have been generated and displayed. In the situation shown in FIG. 5B, if "7" is newly input, and the character string is updated to "5-7", as shown in FIG. 5C, there are no more page ranges that can be specified by a further input of a number at the end of this character string. That is, since this document is formed with eight pages, there are no page ranges such as "5-71". Therefore, page images of the specified fifth to seventh pages are preferentially generated before the other pages, as in the situation shown in FIG. 5B. After that, the page image generation order returns to the normal order, and, as shown in FIG. 5D page images are sequentially generated in ascending order of page numbers (starting from the third page, and then on to the fourth page, in this case). After the situation shown in FIG. 5D, a page image of the eighth page is generated.

In a case where "71" is newly input and the character string is updated to "5-71" in the situation shown in FIG. 5B, the invalid page number "71" is ignored, and it is determined that the character string "5-" is not updated (No in S100 in FIG. 3). Page images of the fifth to eighth pages are then preferentially generated before the other pages. Alternatively, "1" may be ignored, and an input of "5-7" may be recognized. In that case, page images of the specified fifth to seventh pages are preferentially generated before the other pages as described above.

Another specific example of a page range identifying method is now described. FIGS. 6A to 6E show in what order page images are generated/displayed in a case where a number and a symbol (a hyphen) are input as a character string. In this specific example, page images of a document formed with 12 pages are displayed as thumbnails.

Figure 6A:
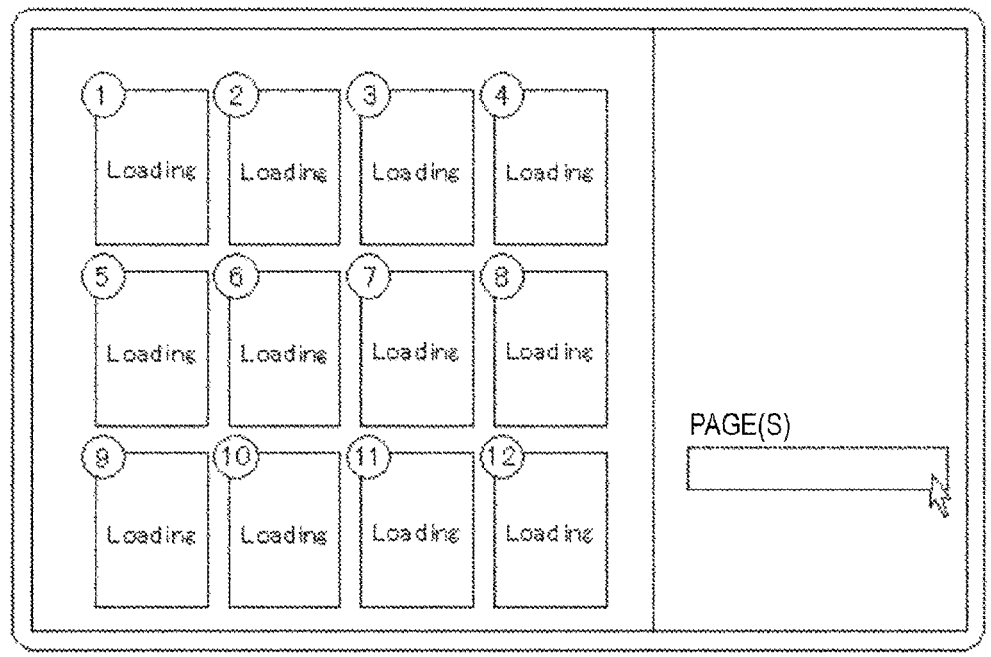
FIG. 6A is a diagram showing an example of thumbnail display (a situation prior to page image generation) according to the embodiment of the present invention.
Figure 6B:
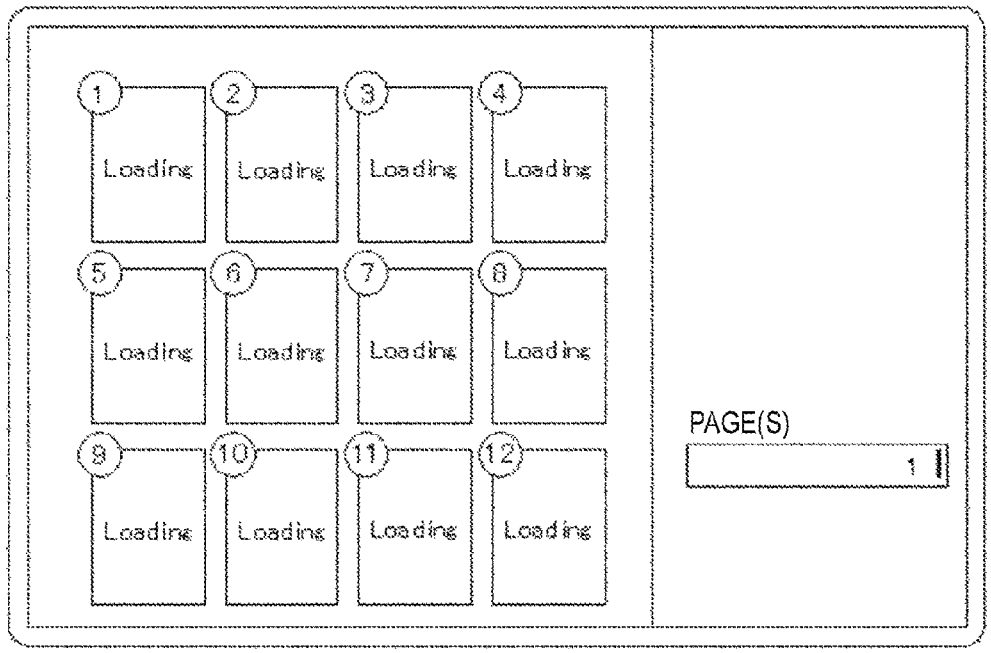
FIG. 6B is a diagram showing an example of thumbnail display (a situation where a number has been input) according to the embodiment of the present invention.
Figure 6C:
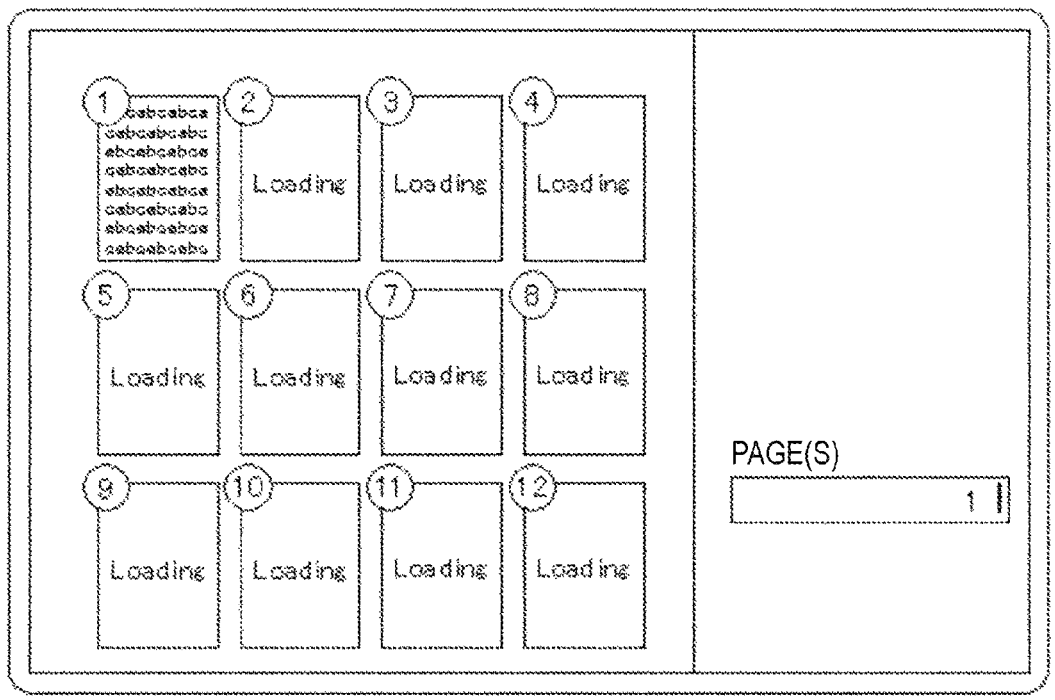
FIG. 6C is a diagram showing an example of thumbnail display (after the situation shown in FIG. 6B) according to the embodiment of the present invention.
Figure 6D:
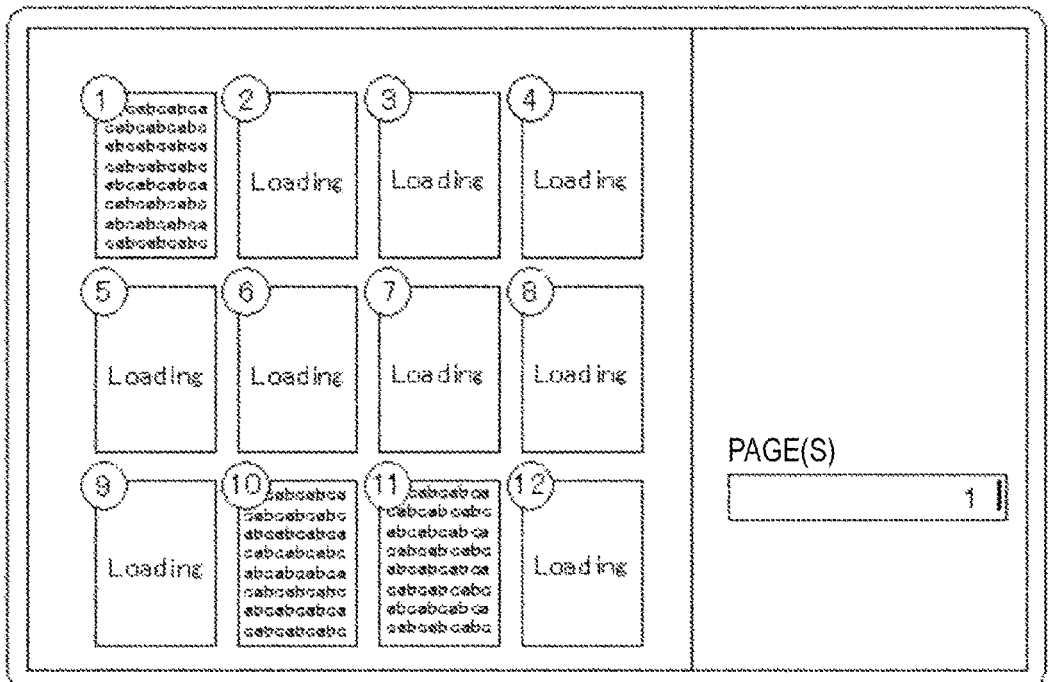
FIG. 6D is a diagram showing an example of thumbnail display (after the situation shown in FIG. 6C) according to the embodiment of the present invention.
Figure 6E:
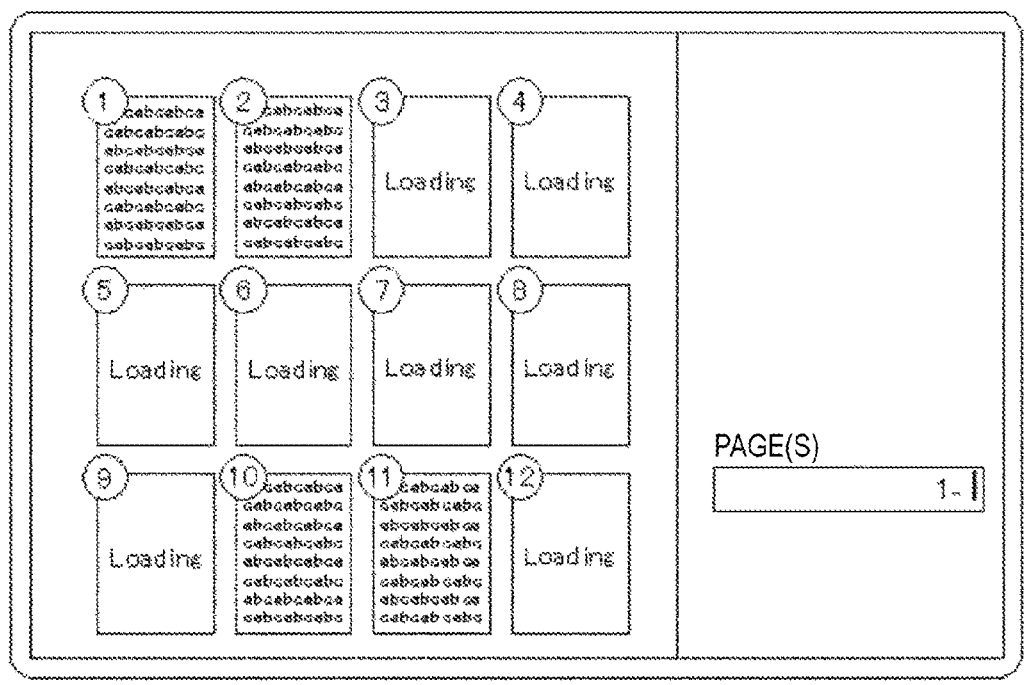
FIG. 6E is a diagram showing an example of thumbnail display (after the situation shown in FIG. 6D) according to the embodiment of the present invention.

FIG. 6A shows a situation where page image generation has not been started yet. In a case where "1" is input as a character string in this situation as shown in FIG. 6B, the first page is identified by this character string as the page range to be preferentially processed, but there is a possibility that a page such as "10", "11", or "12" may be designated by a further input of a number at the end of the character string. Therefore, after a page image of the first page is preferentially generated and displayed as shown in FIG. 6C, page images of the tenth and later pages are preferentially generated and displayed as shown in FIG. 6D. In a case where "-" is newly input and the character string is updated to "1-" in the situation shown in FIG. 6D, a page image of the twelfth page is not preferentially generated, but page images are sequentially generated starting from the page after the first page as shown in FIG. 6E.

Although an example case where a single digit number is input is described above, when a two or greater digit number is input as a character string, for example, pages that can be specified by this number and a number that can be input immediately after this number can be identified as a range of pages whose images are to be preferentially generated. In a case where "10" is input as a character string, for example, pages such as "101", "102", . . . can be identified as a range of pages whose images are to be preferentially generated.

Yet another specific example of a page range identifying method is now described. The specific example described herein concerns what order page images are generated/displayed in a case where a number and a comma are input as a character string.

In a case where "2, 4" is input as a character string, the second page and the fourth page are identified as a range of pages whose images are to be preferentially generated. In a case where the document includes some or all of the 40th to 49th pages, the pages corresponding to the 40th to 49th pages are also identified as a range of pages whose images are to be preferentially generated. In a case where the document includes some or all of the 400th to 499th pages, the pages corresponding to the 400th to 499th pages are also identified as a range of pages whose images are to be preferentially generated. In a case where the user inputs "2, 4-" to the page range specifying unit 24, the second and fourth pages, and the pages after the fourth page are identified as a range of pages whose images are to be preferentially generated. In a case where the user inputs "2, 4," to the page range specifying unit 24, only the second and fourth pages are identified as a range of pages whose images are to be preferentially generated.

In a case where the pages whose images are to be preferentially generated are apart from each other as described above (for example, where a page image of the tenth page is to be generated after a page image of the first page, or where a page image of the 40th page is to be generated after a page image of the fourth page), the user cannot visually check page images even after the page image generating unit 33 preferentially generates the page images, unless the display control unit 23 displays the page images in a visible manner. In view of this, the display control unit 23 of the client terminal 20 controls the form of thumbnail display as necessary in this example, so that a newly generated page image can be displayed in a visible manner.

Figure 7A:
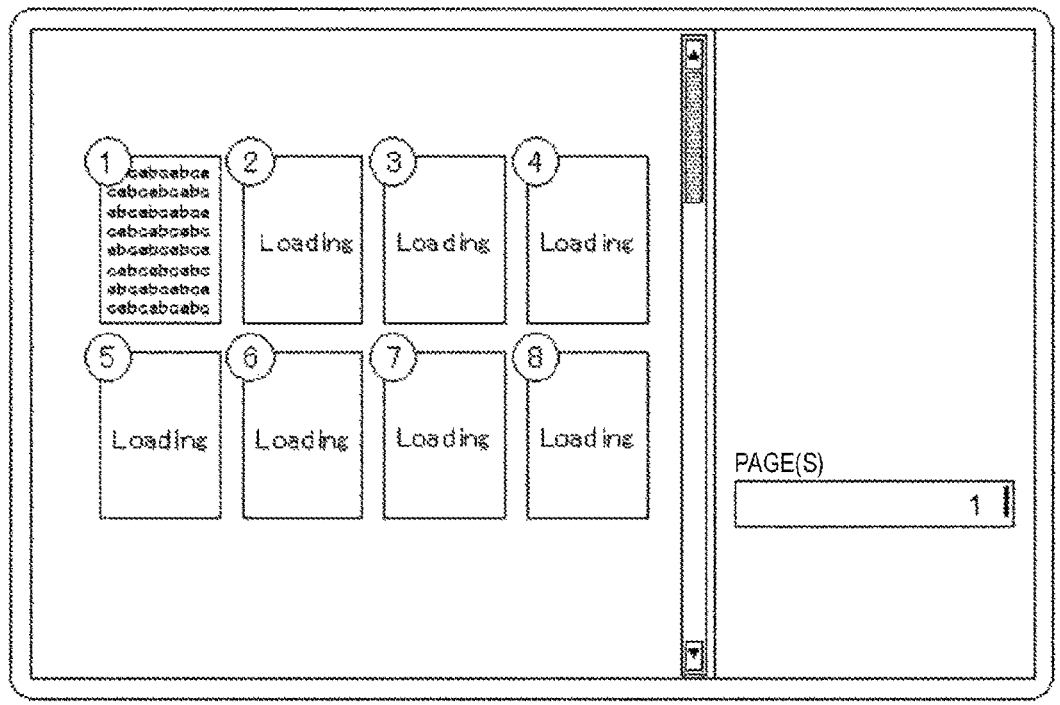
FIGS. 7A and 7B are diagrams showing an example of a change in thumbnail display (scrolling of the display region) according to the embodiment of the present invention.
Figure 7B:
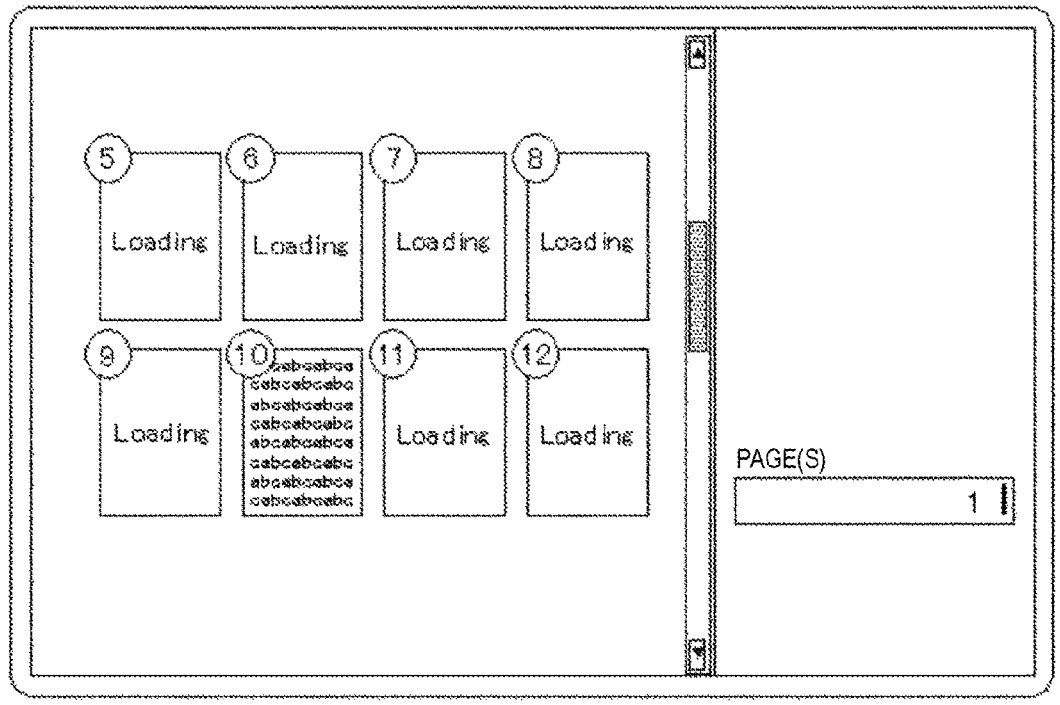

For example, as shown in FIG. 7A, in a case where "1" is input as a character string on a thumbnail display screen having frames (regions) arranged to sequentially display page images of eight pages, the page range identifying unit 34 identifies the first page, the tenth to 19th pages, the 100th to 199th pages, and the like as pages to be preferentially rendered as described above. However, if the page image of the first page is still displayed on the screen at the time when the page image generating unit 33 generates a page image of the tenth page immediately after generating the page image of the first page, the page image of the tenth page cannot be displayed. In such a case, the display control unit 23 automatically scrolls the thumbnail display on the screen, so that the page image of the tenth page can be displayed as shown in FIG. 7B.

Figure 8A:
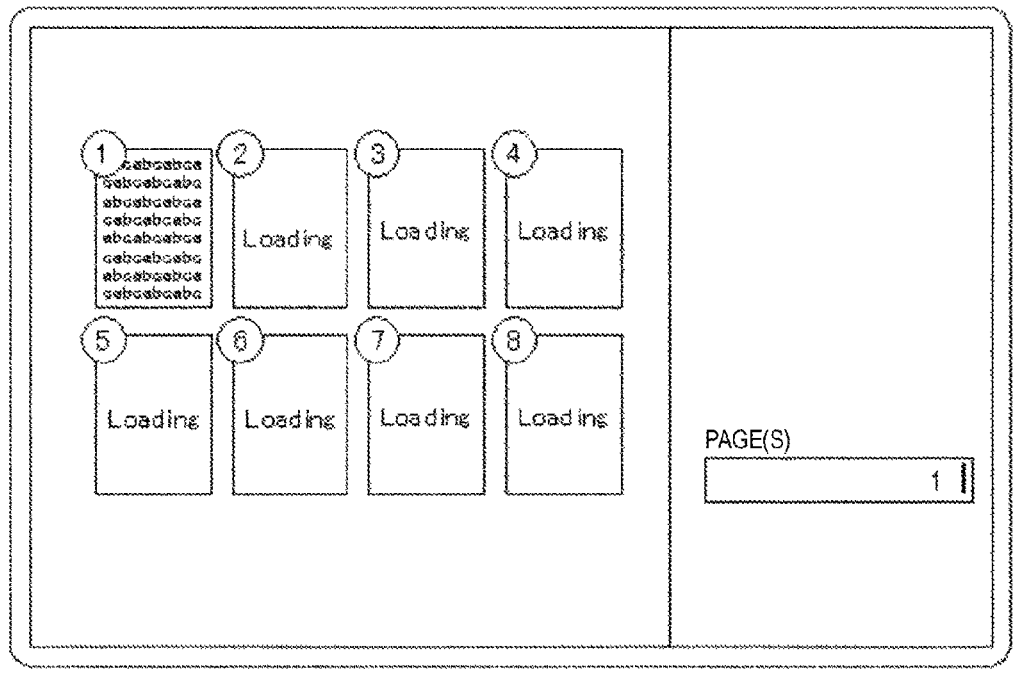
FIGS. 8A and 8B are diagrams showing an example of a change in thumbnail display (an increase in the number of displayed frames) according to the embodiment of the present invention.
Figure 8B:
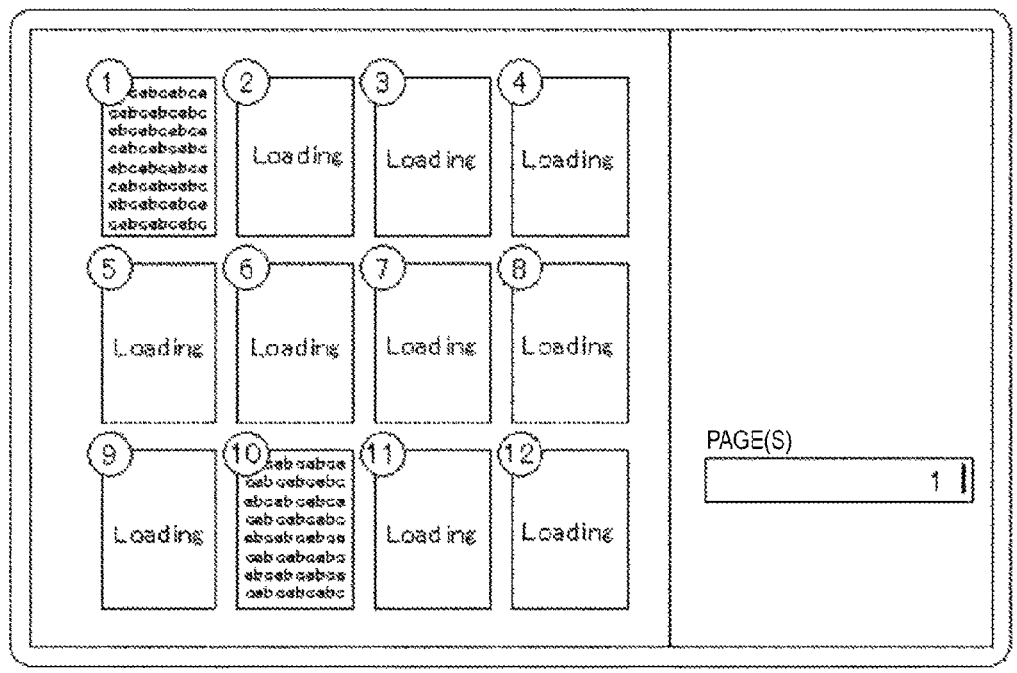

Likewise, as shown in FIG. 8A, in a case where "1" is input as a character string on a thumbnail display screen having frames (regions) arranged to sequentially display page images of eight pages, and the page image generating unit 33 generates a page image of the tenth page immediately after generating a page image of the first page, the display control unit 23 increases the number of page images being displayed as thumbnails by reducing the display size of each page image or increasing the total display area, so that the page image of the tenth page can be displayed together with the page image of the first page, as shown in FIG. 8B.

Figure 9A:
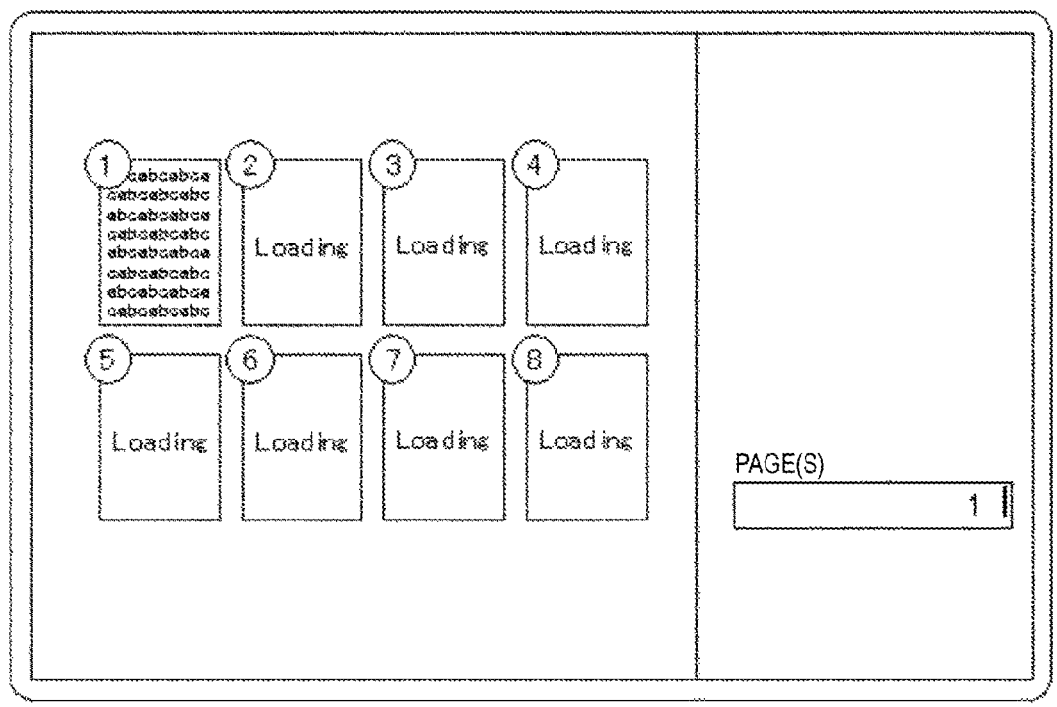
FIGS. 9A and 9B are diagrams showing an example of a change in thumbnail display (a change in the display sequence) according to the embodiment of the present invention.
Figure 9B:
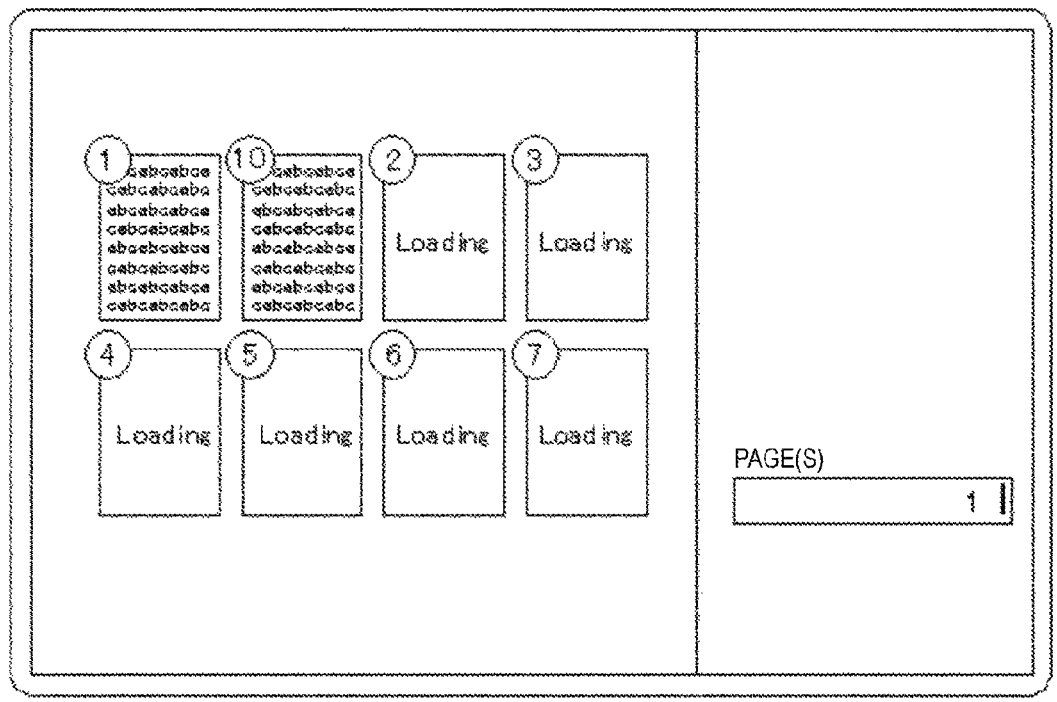

Likewise, as shown in FIG. 9A, in a case where "1" is input as a character string on a thumbnail display screen having frames (regions) arranged to display page images of eight pages, and the page image generating unit 33 generates a page image of the tenth page immediately after generating a page image of the first page, the display control unit 23 can display page images in order of generation (the page image of the tenth page comes immediately after the page image of the first page in this case) by changing the page image display sequence, as shown in FIG. 9B.

As described above, as the display control unit 23 of the client terminal 20 performs control to change the form of thumbnail display, generated page images can be certainly displayed even when images of pages that are apart from one another are generated. Accordingly, the user can visually check the displayed page images, and then issue an instruction about a later process.

The present invention is not limited to the above described example, and any appropriate modifications can be made to the configuration of the image processing system 10 and the method of controlling image processing, without departing from the scope of the present invention.

For example, in the above described example, the web server 30 identifies a page range in a document file, renders the pages included in the page range, provides the client terminal 20 with the page images, and the client terminal 20 displays the page images as thumbnails. However, the web server 30 or the client terminal 20 may identify a page range, and generates and displays page images. Alternatively, the rendering process may be performed by the printing apparatus 40.

Although page images are arranged so as to be collectively viewed as thumbnails, the page images are not necessarily viewed collectively, and may be displayed one by one. In that case, the display control unit 23 performs display control so that generated page images are sequentially displayed.

In the above described example, control is performed when page images are displayed. However, an image processing method of the present invention can also be applied to generation of page images for printing that does not involve display. For example, in a case where generation of page images is started immediately after a document file is selected, when a character string is input through the page range specifying unit, control can be performed so that the page images for printing in the page range identified by the input character string are preferentially generated, and the period of time before a printed result is output can be shortened by controlling the sequence of generation of the page images for printing.

In the above described example, control is performed when page images are displayed as previews before printing. However, an image processing method of the present invention can also be applied to viewing of a document that does not involve printing.

The present invention can be applied to an image processing system that performs rendering to display or print out a document, an image processing program to be executed in the image processing system, a storage medium storing the image processing program, and an image processing method to be implemented in the image processing system.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing system having a display unit to display page images of a document, comprising:
   a controller including a processor and memory and functioning, according to a program, as a page image generating unit and a page range identifying unit; and
   a terminal including a processor and memory and functioning, according to a program, as a page range specifying unit and a display control unit, wherein
   the page range specifying unit receives an input of a character string specifying a page range in a selected document,
   the page range identifying unit identifies the page range in the document based on the input character string,
   the page image generating unit preferentially generates a page image in the identified page range before page images of other pages,
   the display control unit causes the display unit to display the generated page image, and
   the page range identifying unit identifies a first page range number set specified by the input character string and a second page range number set to be specified by the input character string and a character string to be input immediately after the input character string, as the page range in which a page image is to be preferentially generated before the other pages.

2. The image processing system according to claim 1, wherein the page range identifying unit re-identifies the first page range number set and the second page range number set every time the input character string increases by one character.

3. The image processing system according to claim 1, wherein, when the input character string is formed only with a number, the page range identifying unit identifies a page to be specified by the input number and a number to be input immediately after the input number, as the second page range number set.

4. The image processing system according to claim 1, wherein, when the input character string is formed with a number and a hyphen following the number, the page range identifying unit identifies a page range from the start page with the input number to the end page with a number to be input immediately after the input hyphen, as the second page range number set.

5. The image processing system according to claim 1, wherein, when the generated page image is displayed on a screen having a plurality of regions arranged for displaying page images in ascending order of page numbers, and a page image preferentially generated next cannot be displayed on the screen displaying the preferentially generated page image, the display control unit scrolls the regions on the screen or increases the number of the regions, to cause the display unit to display the page image preferentially generated next.

6. The image processing system according to claim 1, wherein, when the generated page image is displayed on a screen having a plurality of regions arranged for displaying page images in ascending order of page numbers, and a page image preferentially generated next cannot be displayed on the screen displaying the preferentially generated page image, the display control unit changes a form of the screen to display page images in order of generation, and causes the display unit to display the page image preferentially generated next.

7. A non-transitory recording medium storing a computer readable program which processes an image and which is executed in an apparatus that generates page images of a document to be displayed by a display unit,
   the image processing program causing the apparatus to:
   receive an input of a character string specifying a page range in a selected document; identify the page range in the document based on the input character string; and
   preferentially generate a page image in the identified page range before page images of other pages, wherein,
   in identifying the page range, a first page range number set specified by the input character string and a second page range number set to be specified by the input character string and a character string to be input immediately after the input character string are identified as the page range in which a page image is to be preferentially generated before the other pages.

8. The non-transitory recording medium storing a computer readable program which processes an image according to claim 7, wherein, in identifying the page range, the first page range number set and the second page range number set are re-identified every time the input character string increases by one character.

9. The non-transitory recording medium storing a computer readable program which processes an image according to claim 7, wherein, in identifying the page range, when the input character string is formed only with a number, a page to be specified by the input number and a number to be input immediately after the input number are identified as the second page range number set.

10. The non-transitory recording medium storing a computer readable program which processes an image according to claim 7, wherein, in identifying the page range, when the input character string is formed with a number and a hyphen following the number, a page range from the start page with the input number to the end page with a number to be input immediately after the input hyphen is identified as the second page range number set.

11. An image processing method implemented in a system having a display unit to display page images of a document, comprising:
 receiving an input of a character string specifying a page range in a selected document;
 identifying the page range in the document based on the input character string;
 preferentially generating a page image in the identified page range before page images of other pages; and
 displaying the generated page image on the display unit, wherein,
 the identifying the page range includes identifying a first page range number set specified by the input character string and a second page range number set to be specified by the input character string and a character string to be input immediately after the input character string, as the page range in which a page image is to be preferentially generated before the other pages.

12. The image processing method according to claim 11, wherein the identifying includes re-identifying the first page range number set and the second page range number set every time the input character string increases by one character.

13. The image processing method according to claim 11, wherein, when the input character string is formed only with a number, the identifying includes identifying a page to be specified by the input number and a number to be input immediately after the input number, as the second page range number set.

14. The image processing method according to claim 11, wherein, when the input character string is formed with a number and a hyphen following the number, the identifying includes identifying a page range from a start page with the input number to an end page with a number to be input immediately after the input hyphen, as the second page range number set.

15. The image processing method according to claim 11, wherein, when the generated page image is displayed on a screen having a plurality of regions arranged for displaying page images in ascending order of page numbers, and a page image preferentially generated next cannot be displayed on the screen displaying the preferentially generated page image, the displaying includes scrolling the regions on the screen or increasing the number of the regions, to display the page image preferentially generated next.

16. The image processing method according to claim 11, wherein, when the generated page image is displayed on a screen having a plurality of regions arranged for displaying page images in ascending order of page numbers, and a page image preferentially generated next cannot be displayed on the screen displaying the preferentially generated page image, the displaying includes changing a form of the screen to display page images in order of generation, and displaying the page image preferentially generated next.

* * * * *